3,303,912
AUTOMATIC CLUTCH CONTROLLING
APPARATUS
Keisuke Fujimoto, Hirakata, and Kiyoharu Murakami and Yoshihiro Okuno, Neyagawa, Japan, assignors to Kabushiki Kaisha Daikin Seisakusho, Neyagawa, Japan, a corporation of Japan
Filed July 22, 1964, Ser. No. 384,419
Claims priority, application Japan, Dec. 19, 1963, 38/68,665; Mar. 25, 1964, 39/16,576
10 Claims. (Cl. 192—.07)

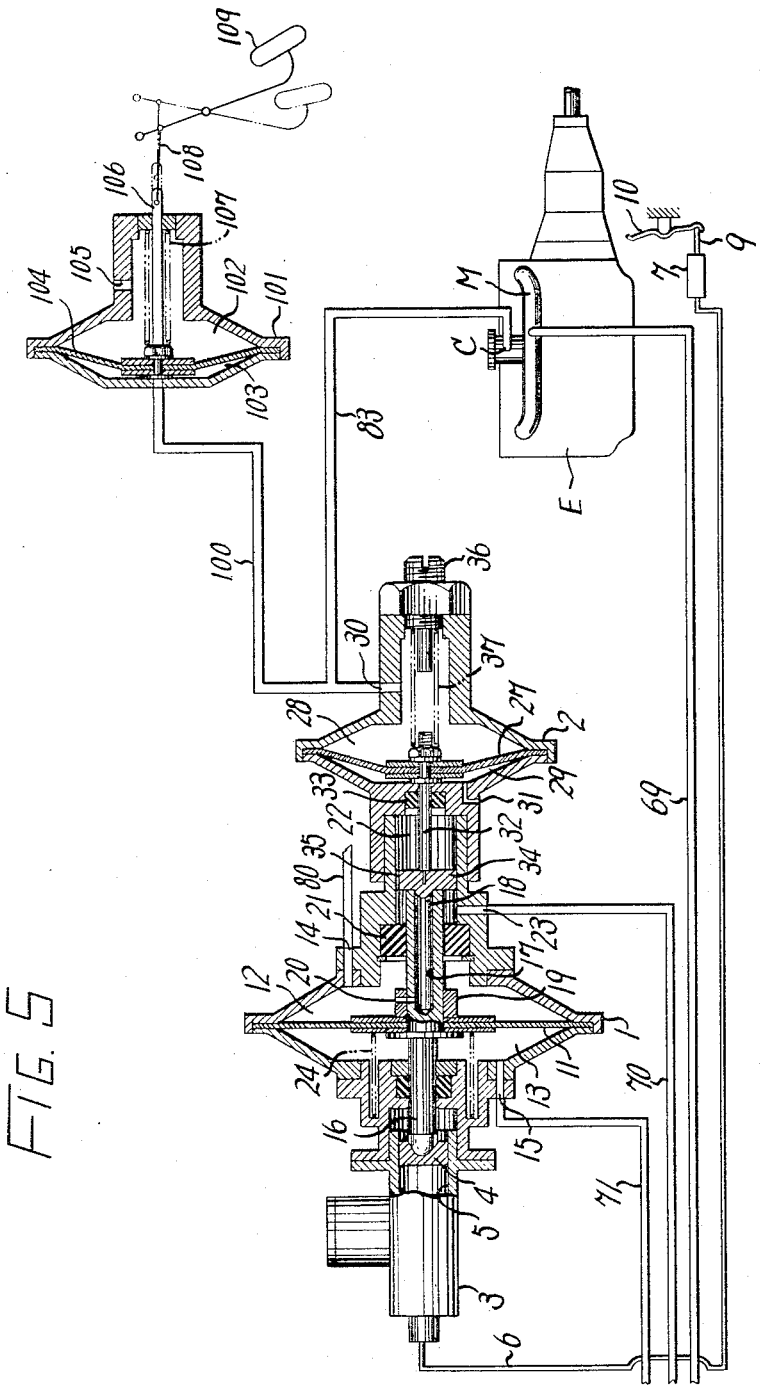

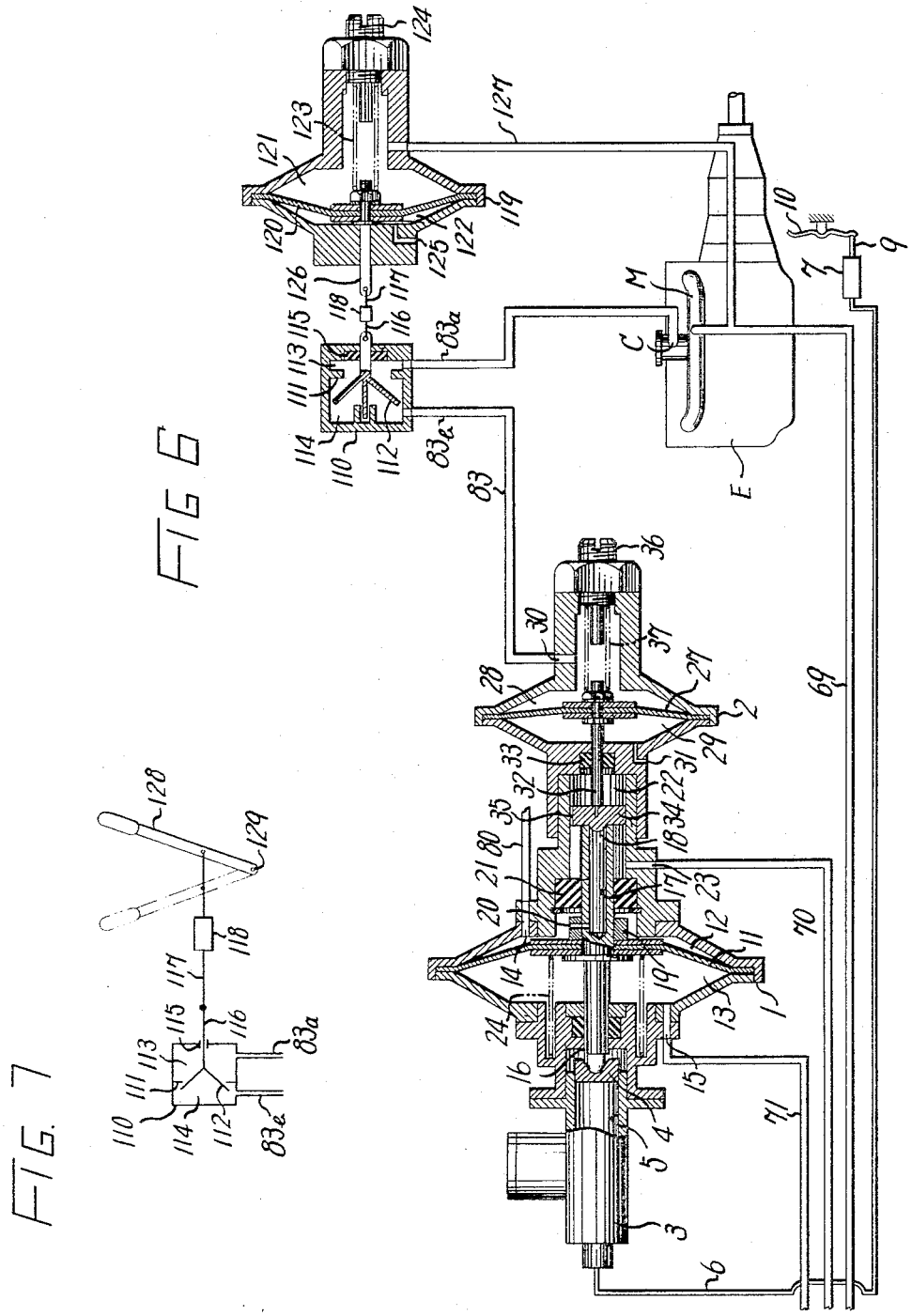

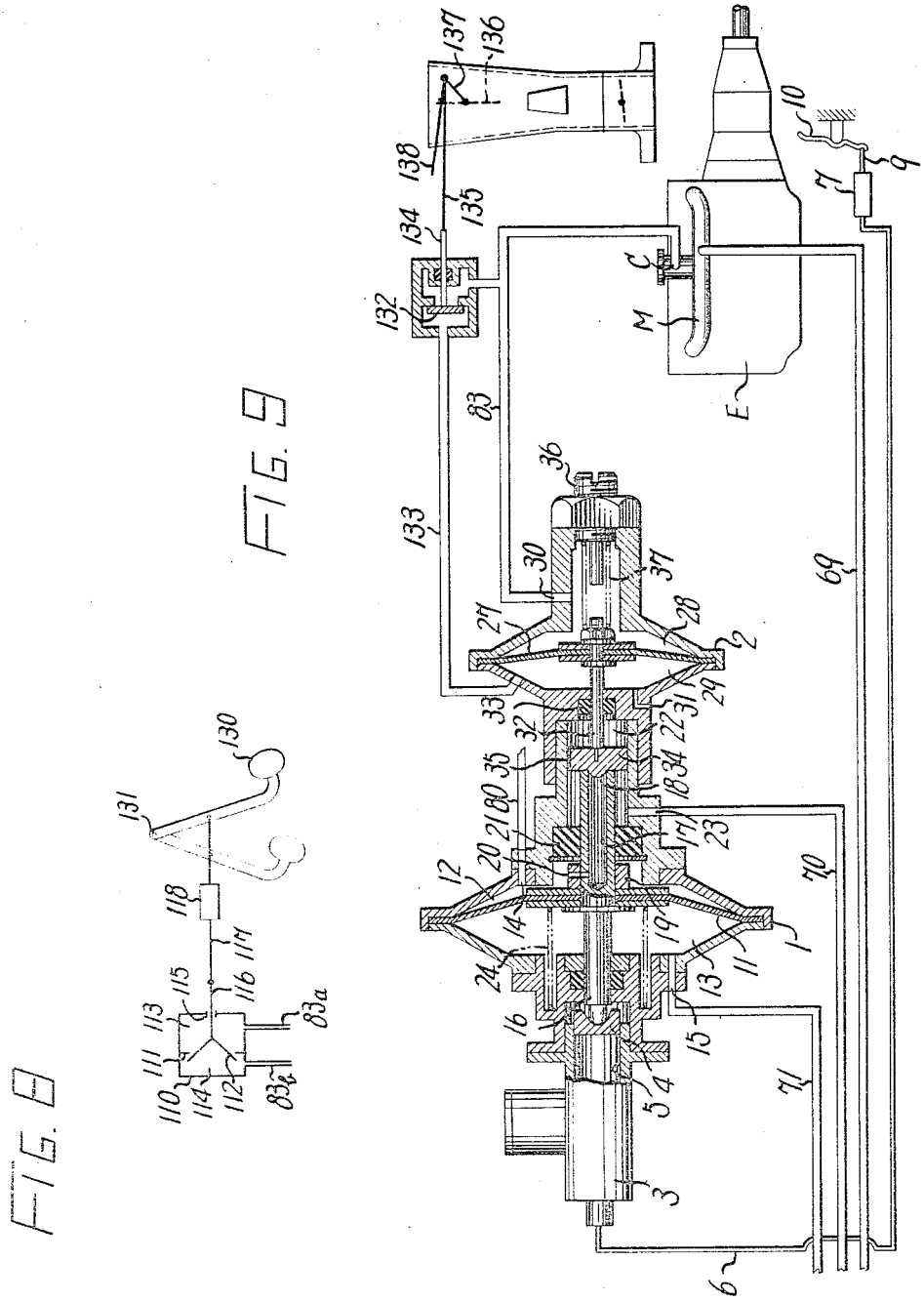

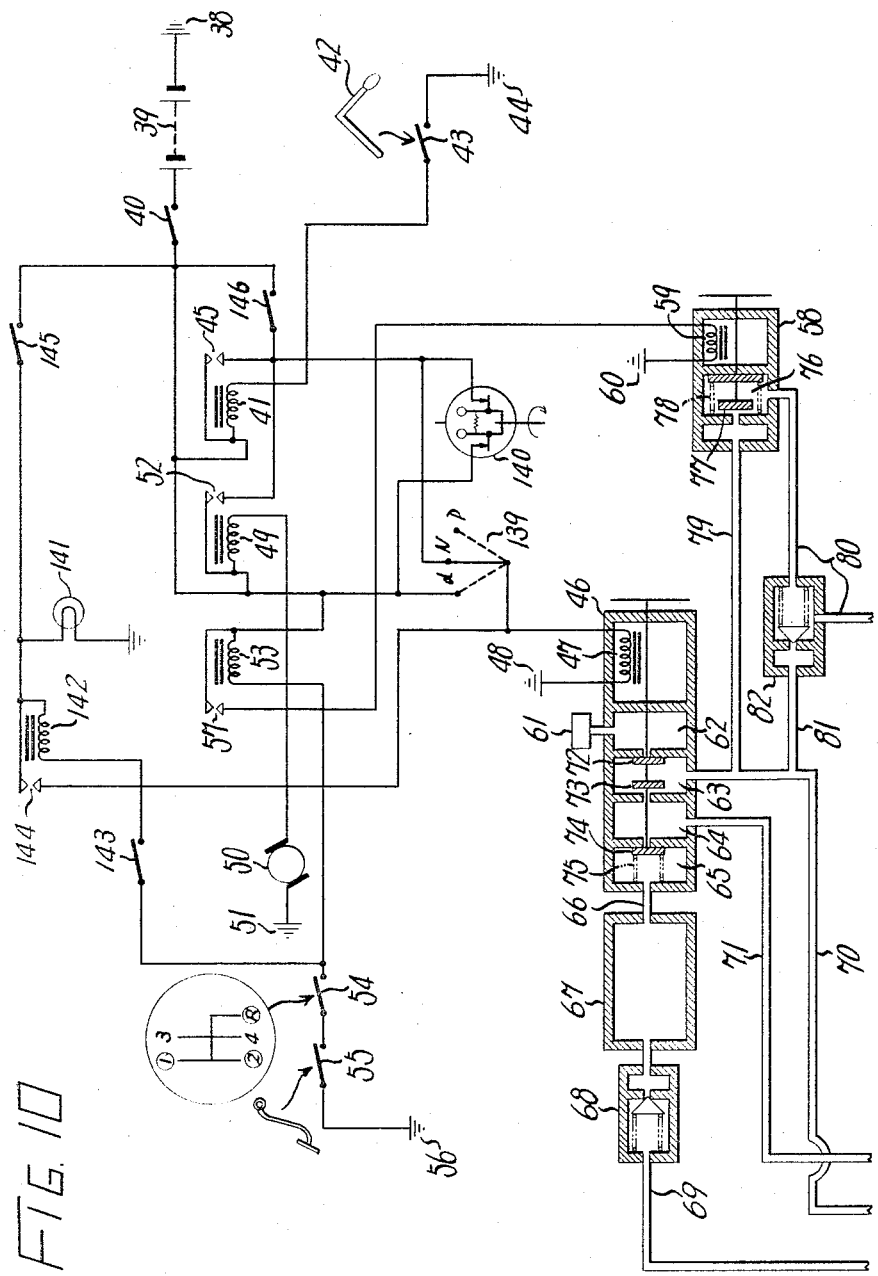

This invention relates to an improvement of automatic controlling apparatus for clutches, primarily of automobiles.

Thus far, apparatus designed to control connection and disconnection of a clutch automatically by taking advantage of negative pressures which develop in the intake manifold and carburetor venturi, in connection with the atmospheric pressure, have been made known. However, such apparatus require some additional means, for example a centrifugal or electromagnetic clutch, in order to raise the transmission torque of the clutch in adequate proportion to the increase in the number of engine revolutions. Without such a time lag auxiliary means, the clutch connection will be effected behind the increase in the engine revolutions, and invite abrasion of the clutch facings, racing of the engine, and other undesirable results.

An object of the invention is to provide an automatic clutch controlling apparatus of the type as heretofore proposed but which dispenses with the centrifugal clutch or the like, and which effects smooth clutch connection and transmission of torque, and keeps the transmission torque of the clutch well proportioned to the number of revolutions of the engine, thereby precluding any possibility of slow starting of automobiles, abrasion of clutch facings due to lost sliding motion of clutch parts, and other undesirable phenomena, and permitting the driver to operate the clutch precisely at will in gear changing for starting the automobile or while the latter is running.

Another object of the invention is to enable an automatic controlling apparatus as described above to connect the clutch satisfactorily irrespective of an increase of the negative pressure in the carburetor venturi due to the starting conditions, for, in overload starting such as in sudden starting on an even land or starting midway on a slope for climbing, the accelerator pedal must be pressed down suddenly and the clutch be connected in order to get sufficiently large engine output, when the engine revolutions increase proportionally but is not accompanied with a corresponding rise of the negative pressure in the carburetor venturi with the result that smooth operation of the automobile may become impossible due to time lag of clutch connection.

Another object of the invention is to provide an apparatus for controlling by means of a variable throttle valve the negative pressure in the carburetor venturi which is transmitted to the control valve for controlling the stroke from the position immediately before clutch connection to the position for complete clutch connection, of the servo-motor which governs the clutch connection through the sleeve cylinder.

Another object of the invention is to permit the automatic clutch controlling apparatus to prevent the danger of erroneous starting of the automobile in the case when, in starting the engine for example in a cold season, the choke lever is manipulated to increase the gasoline concentration in the mixed fuel which is fed into the engine in order to facilitate the starting, with the result that the negative pressure in the carburetor venturi is somewhat increased because of the tendency that the engine speed is slightly increased over the idling speed at the time of normal starting, and that the change lever may be shifted to the first speed position (or to the second position as the case may be) because, in the automatic clutch controlling apparatus as described above, the working parts of the clutch tend to be connected simultaneously with the starting of the engine.

Still another object of the invention is to improve the electric circuit for keeping said controlling apparatus informed of the intention of the driver, thereby to ensure safety while the automobile is running, avoid unstable contact of the contact points during idling of the engine, prevent unintended engine stop, and to effect automatic working of engine brake when the brake is to be applied.

Other objects, advantages and details of the apparatus provided by this invention will become apparent in the course of the following detailed description made with reference to the appended drawings, wherein:

FIG. 5 shows diagrammatically a means to operate the control valve adequately corresponding to the starting condition of the automobile, in which the diaphragms are in the positions they are to assume immediately before clutch connection;

FIG. 6 shows diagrammatically an automatic variable throttle valve means which adjusts the negative pressure valve in the negative pressure chamber of the control valve;

FIGS. 7 and 8 are schematic views of variable throttle valve means in gear with a hand lever and an accelerator pedal, respectively;

Figure 11:
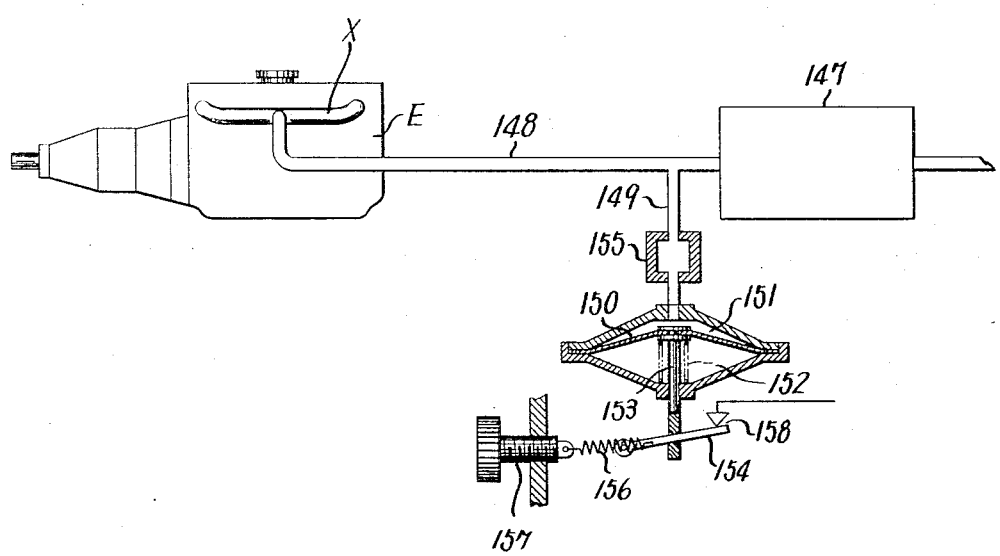

FIG. 9 diagrammatically shows a means to couple the operation of the control valve diaphragm with the manipulation of the choke lever;

FIG. 10 is a diagram of an improved electric circuit according to the invention; and FIG. 11 is a diagrammatic view of a jumping contactor put into the above circuit.

In order to facilitate the understanding of the present invention, description will be made first of the tendency of the negative pressures taken out of the carburetor venturi and intake manifold of an engine.

In a gasoline engine for automobiles, the values of negative pressures which develop in the intake manifold and carburetor venturi vary with the speed with which the accelerator pedal is trodden to control the engine speed.

Figure 3:
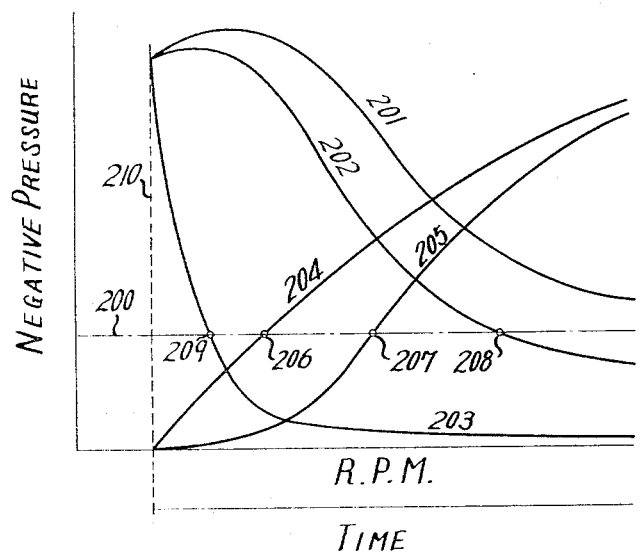
FIG. 3 is a graph giving tendency curves which represent the conditions of negative pressures taken out of the carburetor venturi and intake manifold by the speed of the engine, in which the vertical broken line represents the number of revolutions of the engine during idling and the horizontal broken chain line represents the negative pressure required for initiating clutch connection.
Figure 4:
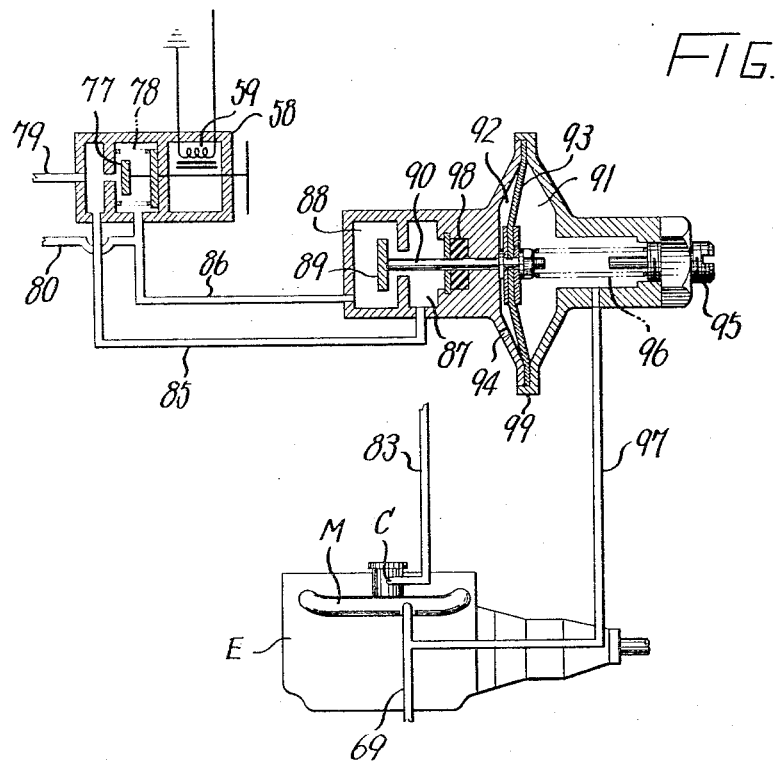
FIG. 4 is a diagrammatic view of the controlling apparatus according to the invention at the time of overload starting of the automobile.

Referring to FIG. 3, the negative pressure in the intake manifold shows a tendency as represented by the curve 201, as the accelerator pedal is worked gradually. When the pedal is trodden in the normal fashion, the pressure will undergo a change as indicated by the curve 202, and if the pedal is worked suddenly, the pressure value drops sharply as indicated by the curve 203.

Meanwhile, the negative pressure conveyed from the carburetor venturi to the negative pressure chamber of the control valve varies more or less with the piping and other mechanisms provided, but in general it increases almost proportionally with the engine speed as indicated by the curve 204 if the accelerator pedal is trodden slowly or in the usual manner, and the increment of the value is very small initially as indicated by the curve 205 if the pedal is worked rapidly. Thus, if the value of the negative pressure in the carburetor venturi at which the control valve is operated, which in turn begins to control the servo-motor thereby to start connection of the clutch, is assumed to be such that is represented by the line 200, then the clutch will begin to make a contact at the point 206 as the accelerator pedal is trodden by degrees, and at the point 207 if the pedal is trodden rapidly.

These negative pressure characteristics are taken advantage of in the present invention. The servo-motor 1 is integrally provided with a hydraulic device 3 for operating the control valve 2 and the clutch release. In the hydraulic device 3 is fitted a piston 4, and the cylinder 5 is communicated with a sleeve cylinder 7 through a hydraulic pipe 6 extending from a part of the former cylinder. In the sleeve cylinder 7, the piston 8 drives the piston rod 9, which in turn operates the clutch as it is kept in contact with one end of a clutch release lever 10. In other words, the piston 4 of the hydraulic device 3 is always subjected to a force applied in the direction for connecting the clutch because of the reciprocating tendency of the clutch. Hence, the piston 4 tends to move rightwise as shown in the figures.

The servo-motor 1 is divided by a diaphragm 11 into two compartments, i.e. the right servo-motor chamber 12 and the left servo-motor chamber 13, provided with airports 14 and 15, respectively. To the diaphragm 11, a piston rod 16 is fixed, which is kept at the left end in contact with the piston 4 of the hydraulic device 3, and is constantly subjected to the repulsive force of the clutch. The piston rod 16 is provided with a bore 17 inside the portion in the right servo-motor chamber 12, that is, in the right side of the diaphragm 11, the right end of said bore forming a movable valve mouth 18. The bore 17 is communicated with an airport 20 provided in a lock nut 19 fastening the diaphragm 11 and the piston rod 16 together, said airport 20 having one opening inside the right servo-motor chamber 12. The right hand chamber 12 defines, together with the control valve 2, a valve chest 22 in between, that is, in the space formed at the right of a rubber seal 21 surrounding the piston rod 16. The valve chest 22 is also provided with an airport 23. In the left servo-motor chamber is fitted a compression spring 24, which keeps the diaphragm 11 pressed toward the right hand chamber, lest said diaphragm 11 not be moved unstably by vibration from the external source.

On the right of the servo-motor 1, as described above, the control valve 2 is mounted integrally by means of the internally threaded portion 25 and lock nuts 26. The valve 2 is divided by a diaphragm 27 into a negative pressure chamber 28 and an atmospheric pressure chamber 29, provided with a negative pressure inlet 30 and an air vent 31, respectively. To the diaphragm 27 is fixed a connecting rod 32, which extends at the left end into the valve chest 22, through a seal 33 from the atmospheric pressure chamber 29. On the left end of the connecting rod 32, a movable valve seat 34 capable of sliding through the valve chest 22 is provided, opposite to the movable valve mouth 18. The valve seat 34 is provided with a hole 35 in such a manner that its sliding motion through the valve chest 22 is not thereby interrupted. Inside the control valve negative pressure chamber 28, a compression spring 37 so constructed as to have its compression force adjusted by an adjust screw 36 is fitted, thereby keeping the diaphragm 27 pressed toward the atmospheric pressure chamber 29 of the control valve.

The servo-motor 1 and the control valve 2 are controlled by a pneumatic control device which is operated by an electric control device in response to the negative pressures from the intake manifold M and carburetor venturi C, respectively. To be more precise, the circuits of said electric control device are connected in series with a body earth 38, storage battery 29, and ignition key switch 40. The numeral 41 designates a main valve relay, communicating with a switch 43 provided on the change lever 42. When the ignition key switch 40 and the switch 43 are turned on through the body earth 44, a closed circuit is constituted by the body earth 38, storage battery 39, ignition key switch 40, main valve relay 41, change lever switch 43, and body earth 44. The change lever switch 43 is so constructed that it is turned on as the driver grips the change lever 42, and is turned off as the driver quits his grip. The main valve relay is equipped with contacts 45, which are communicated with the body earth 48 through the magnet 47 of the main valve 46. When the relay 41 operates, the contacts 45 are connected, and the electric circuit is closed through the body earth 38, storage battery 39, ignition key switch 40, main valve relay contacts 45, magnet 47 and body earth 48, so that the magnet 47 is excited to operate the main valve 46.

For an idling relay 49, an electric circuit is constituted including said body earth 38, storage battery 39, ignition key switch 40, idling relay 49, dynamo 50 for battery charging, and body earth 51. As soon as the ignition key switch 40 is turned on (even when the engine is not started), the voltage from the storage battery 39 is impressed on said relay 49, which in turn closes the contacts 52, and the voltage of the storage battery 39 is further applied to the magnet 47 of the main valve 46, thereby to operate the latter valve. When the engine has been started and the normal idling speed has been reached, the relay 49 discontinues its operation and the contacts 52 are opened so that the voltage application to the magnet 47 of the main valve 46 is interrupted. More exactly, the voltage of the storage battery 39 in the above circuit is of opposite polarity to the generation voltage of the dynamo 50, and when the ignition key switch 40 is turned on, the generation voltage of the dynamo 50 is zero because the engine is not running. Hence, the entire voltage of the storage battery 39 is applied to the idling relay 49, which consequently closes the contacts 52. As the engine has been started and the speed is increased, the generation voltage of the dynamo 50 is raised, and therefore the voltage of the storage battery applied to the idling relay 49 is gradually lowered until the contacts 52 are opened. That is, by adjusting the idling relay 49 so that it may function when the engine speed drops a little below the idling speed, it is possible to permit said relay 49 to operate whenever the engine speed drops in the face of an overload for some reason to a level below the normal idling speed. In other words, the idling relay 49 is designed to prevent unintended engine stop, by the mechanism described hereunder.

The numeral 53 indicates a free-path relay connected to the body earth 56 through a change gear switch 54 which is turned on as the change lever is positioned in the low speed range of the automobile, that is, in the low gear (inclusive of the second gear as the case may be) and reverse positions, and is turned off in the high speed range, that is, in the second and third gear positions (or third and fourth gear positions), and through an accelerator switch 55 capable of being turned on as the engine revolution is in the low and medium speed ranges and turned off in the high speed range. If the above switches are both turned on, the electric circuit consisting of the body earth 38, storage battery 39, ignition key switch 40, free path relay 53, change gear switch 54, accelerator switch 55, and the body earth 56, is closed, thereby making connection of the free path relay contacts 57. The contacts 57 are connected to the body earth 60 through the magnet of the free path valve 58. Upon connection of said contacts 57, the voltage of the storage battery is applied to the magnet 59 to operate the same. The main valve 46 is equipped with an air cleaner 61, so that purified atmospheric air can be attracted into the chamber 62. Further, chambers 63, 64, and 65 are provided, the last-named chamber 65 being communicated through a passage 66 with a negative pressure tank 67, which is designed to receive negative pressure from the engine intake manifold M through a passage 69. The chamber 63 is communicated with the valve chest 22 of the servo-motor 1 through a passage 70 and airport 23, whereas the chamber 64 is communicated with the left servo-motor chamber 13 through a passage 71 and airport 15. The passage between the chambers 62 and 63 is closed or opened by an atmospheric suction valve 72, the passage between the chambers 63 and 64 by an equalizing valve 73, and the passage between the chambers 64 and 65 by a negative pressure valve 74. Under normal conditions, the atmospheric suction valve 72 and the negative pressure valve 74 are closed and the equalizing valve 73 is opened, by means of a return spring 75. The relative valve positions are reversed when the main valve relay 41 operates and the magnet 47 is excited, that is, the atmospheric suction valve 72 and the negative pressure valve 74 are opened while the equalizing valve 73 is closed.

The free path valve 58 is provided with a valve chest 76, in which a valve 77 and a return spring 78 are accommodated, said chest 76 being communicated at one end with the chambers 63 of the main valve 46 through the valve 77 and passages 79 and 70, and at the other end with the right hand chamber 12 of the servo-motor through the passage 80 and the airport 14. The valve 77 of the free path valve 58 is normally kept open by the return spring 78, and communicates with the passage 79, valve chest 76, and passage 80. It is closed as the free path relay 53 functions and the magnet 59 is excited, thereby shutting off the passages 79 and 80.

Between the passages 70 and 80, a bypass 81 is provided, which is equipped with a check valve 82 which is opened only in the direction from the passage 70 to the passage 80, and which prevents any counterflow in the reverse direction. The negative pressure chamber 28 of the control valve is communicated with the negative pressure outlet of the carburetor venturi C, through the negative pressure inlet 30 and the passage 83, so that it receives negative pressure from the carburetor venturi C, whereas the atmospheric chamber 29 of the control valve is communicated with the atmospheric air through the air vent 31.

Figure 1:
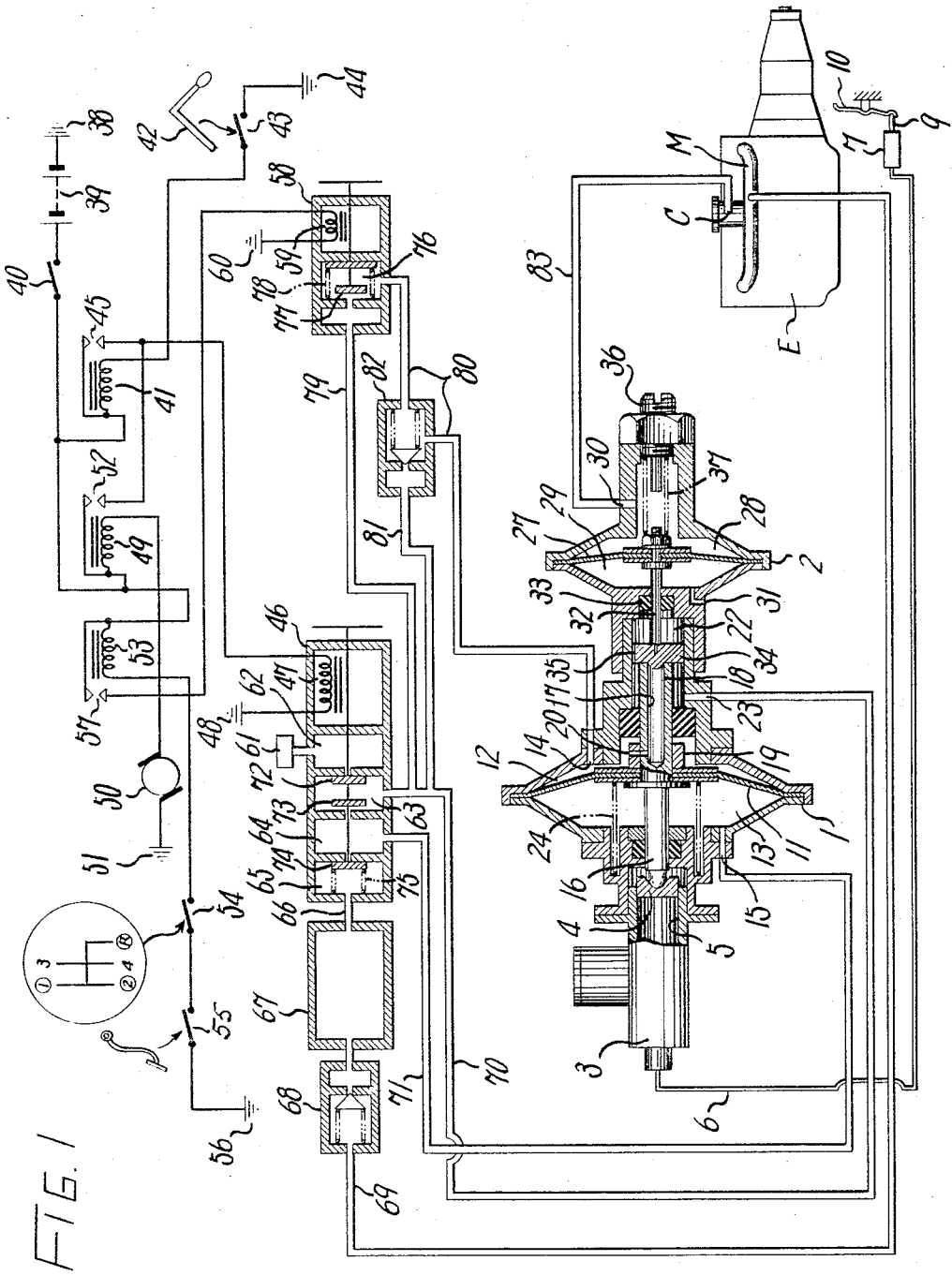
FIG. 1 is a diagrammatic view showing systematically a preferred embodiment of the invention, in which the engine ignition key switch is turned off, electric contacts are open, the change lever is in the neutral position, and the clutch is completely connected.

What has so far been described is the general structure of the present invention. When the engine is out of operation, with the ignition key switch 40 in the off position, all the electric circuit contacts kept open, and the main valve 46 and free path valve 58 are both in the inactive positions, then the diaphragms 11 and 27, respectively, of the servo-motor 1 and the control valve 2 are kept in the positions indicated in FIG. 1, as they are subjected to the recovering force of the clutch, and the clutch is in the completely connected position.

In order to start the engine, the ignition key switch 40 is turned on. (The engine is not yet started by this procedure alone.) Then, the entire voltage of the storage battery 39 is applied to the idling relay 49, whereby said relay operates to close the contacts 52, and the main valve magnet 47 is excited thereby to open the atmospheric suction valve 72 and the negative pressure valve 74 of the main valve 46 and closes the equalizing valve 73 of said main valve. Consequently, the air in the left servo-motor chamber 13 is sucked out by the negative pressure stored up in the negative pressure tank 67, through the airport 15, passage 71, chambers 64 and 65, and passage 66, while the atmospheric air is introduced into the right servo-motor chamber 12 through the air cleaner 61, chambers 62 and 63, passage 79, chamber 76 of the free path valve 58, passage 80, and airport 14. Thus, the equilibrium of air pressure between the right chamber 12 and left chamber 13 of the servo-motor 1 is lost, as the air pressure in the left chamber 13 drops below that in the right chamber 12. This, in turn, causes the diaphragm 11 to move toward the left chamber 13 in defiance of the recovering force of the clutch and the resilience of the compression spring 24, that is, to the position indicated by thick lines in FIG. 2, and accordingly the piston rod 16 fixed to the diaphragm 11 moves the piston 4 of the hydraulic device 3 leftward, with the result that the clutch release lever 10 is pushed by the oil pressure to the position D, whereby the clutch is completely disconnected. At the same time, the diaphragm 27 of the control valve is also moved leftwise by the resilience of the spring 37, until it is pressed against the wall of the control valve air chamber 29 (the position indicated by thick lines in FIG. 2).

After the engine has been started and the number of revolutions has reached the idling level, the idling relay 49 discontinues functioning and cuts off the contacts 52 thereby depriving the magnet 47 of the magnetic force, so that the air suction valve 72 and negative pressure valve 74 of the main valve 46 are closed while the equalizing valve 73 is opened. Therefore, the air in the right servo-motor chamber 12 flows into the left servo-motor chamber 13 through the airport 14, passage 80, free path valve 58, passages 79 and 70, chamber 63 of the main valve 46, and then through the passage 71 and airport 15, so that the air pressure in the right chamber 12 is balanced with that in the left chamber 13 and the diaphragm 11 is brought back to the position indicated by fine imaginary lines in FIG. 2. It means that the clutch release lever 10 assumes the position H. Meanwhile, the negative pressure tank 67 is supplied with negative pressure from the engine intake manifold M as the engine E is running, and the air pressure in said tank 67 drops with suction of the air inside by the intake manifold M.

In the sequence of operation as described above, it appears likely that, if the negative pressure tank 67 has insufficient negative pressure, the leftwise displacement of the diaphragm 11 may not be caused effectively. To compensate for such possibly inadequate operation, it is advisable either to increase the capacity of the negative pressure tank 67 and machine the valves in such a manner that they have sufficient air-tightness or to provide another negative pressure tank, which is not shown. Should it happen that the contacts 52 of the idling relay are shut off to move the diaphragm 11 toward the right hand chamber 12, so that the clutch release lever 10 is displaced from the position H to the position P, the pressure plate of the clutch which is not shown comes into contact with the clutch facing, and the engine torque is transmitted to the wheels through the clutch thereby to urge propulsion of the automobile. At this juncture, the engine is idling at a low speed, and therefore the engine torque is not sufficiently high to roll the vehicle forward. The number of revolutions rapidly drops to a level below the normal idling speed, until the idling relay 49 operates the valves of the main valve 46 in the same manner as when the ignition key switch 40 has been turned on. Thus, the position of the diaphragm 11 is corrected, and the clutch release lever 10 is shifted to the position H or D, whereby the clutch is broken off, and hence no unintended engine stop results. In this case, it is possible that the diaphragm 11 may be displaced more than necessary toward the right chamber 12 thereby to effect the clutch connection before the number of engine revolutions is increased sufficiently. However, this is prevented by a device which is described later, and there can be no possibility of such a trouble being caused at the time the engine is started.

If a driver grips the change lever 42 in order to start the vehicle, the change lever switch 43 is turned on, and the main valve relay 41 operates to close the contacts 45 and thus to excite the main valve magnet 47. Thereupon, the valves 72 and 74 of the main valve 46 are opened and the valve 73 is closed in the manner as described earlier, that is, as when the ignition key switch 40 has been turned on, and the atmospheric air flows into the right servo-motor chamber 12, whereas the air in the left chamber 13 is sucked up into the negative pressure tank 67. Consequently, the diaphragm 11 is again moved toward the left hand chamber 13, that is, to the position indicated by thick lines in FIG. 2, whereby the clutch is completely shut off.

If, in order to start the automobile, the change lever 43 is shifted to the first speed gear (or the second gear as the case may be) or to the reverse gear, then the change lever switch 54 is turned on as well as the accelerator switch 55. Therefore, the free path relay 53 functions to close the contacts 57, and excites the magnet 59 of the free path valve 58, thereby closing the valve 77 and the passages 79 and 80. On completion of the change gear shifting, the driver releases the change lever 42. Then, the change lever switch 43 is turned off and the circuit is opened, and the main valve relay 41 opens the contacts 45, whereby the main valve magnet 47 loses the magnetic force, the valves of the main valve 46 move back to the original positions by the force of the return spring 75, and the atmospheric air suction valve 72 and the negative pressure valve 74 are closed and the equalizing valve 73 is opened. Hence, the passages 70 and 71 are communicated with each other. In this case, as described above, the passages 79 is disconnected with the passage 80, and the check valve 82 is interposed in the bypass 81 between the passages 70 and 80, therefore the exhaust passage 80 from the airport 14 is completely closed, so that the air in the right servo-motor chamber 12 flows through the airport 20 of the nut 19, vent hole 17, movable valve mouth 18, valve chest 22 and through the airport 23 of said chest, into the passage 70. The air further flows through the chambers 63 and 64, passage 71, and airport 15, into the left servo-motor chamber 13, thereby to equalize the air pressures in the right hand chamber 12 and the left chamber 13. Accordingly, the diaphragm 11 is moved by the recovering force of the clutch toward the right hand chamber 12, until the movable valve mouth 18 is brought into contact with the movable valve seat 34. As said valve mouth 18 is kept in close contact with said valve seat 34, the vent hole 17 is closed, and the right hand chamber 12 is completely closed, so that the air inside the said chamber 12 is prevented from further flowing out. Thus, the diaphragm 11 is stopped, and the clutch is kept still in the position immediately before the connecting position, with the clutch release lever 10 stopped at the position H. The time required for shifting the clutch release lever 10 from the position D to the position H can be controlled suitably by adjusting the aperture of the airport 20 provided on the nut 19. This adjustment is made automatically by the flow velocity of the air immediately before the movable valve mouth 18 is brought into contact with the movable valve seat 34.

Figure 2:
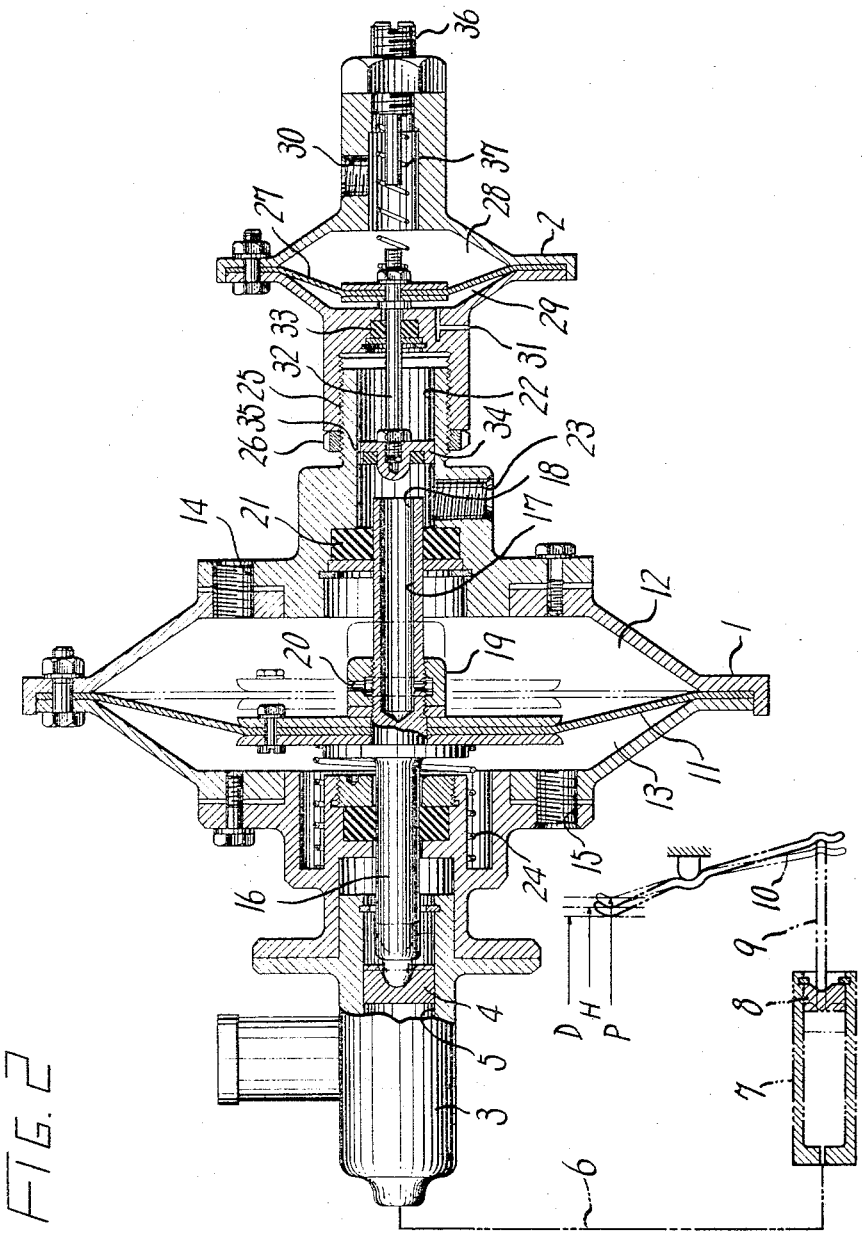
FIG. 2 is a detail view of the servo-motor and control valve incorporated in the apparatus according to the invention, in which the clutch is completely disconnected, the fine imaginary lines in the figure indicating the positions of the servo-motor diaphragms and the clutch release lever immediately before the clutch is connected.

The positions of the above members indicated by fine imaginary lines in FIG. 2 represent the condition in which the movable valve mouth 18 is kept in close contact with the movable valve seat 34.

As already described, the torque of the engine is still shut off while the clutch is in the position as illustrated above, and the automobile will not start. Thus, it is an advantageous feature of the present invention that the position just before clutch connection is controllable as the stop position for the servo-motor diaphragm with respect to a suitable number of revolutions of the engine. This prevents time lag for subsequent clutch connection and permits smooth transmission of the engine torque. The above feature characterizes the remarkable progressiveness of the invention which has not been found in the automatic clutch controlling apparatus heretofore in use.

Following the above procedure, the accelerator pedal is trodden to start the vehicle, when the negative pressure of the carburetor venturi C rises sharply, thereby causing a decrease of the air pressure in the negative pressure chamber 28 of the control valve 2 through the passage 83 opposite to the negative pressure outlet of said venturi, and further through the negative pressure inlet 30. Hence, the diaphragm 27 moves in defiance of the resilient force of the compression spring 37, toward the negative pressure chamber 28, over a distance proportionally with the increase of said negative pressure. At this time, the rightward displacement of the diaphragm 27 is not interrupted because the air chamber 29 is provided with an air vent 31. The rightward displacement of the diaphragm 27 is accompanied by a similar motion by the movable valve seat 34 inside the valve chest 22 by means of the connecting rod 32, so that a slight clearance tends to be formed between the movable valve mouth 18 and the movable valve seat 34. When the clearance has been formed, again the communication is established between the right servo-motor chamber 12 and the left hand chamber 13, through the air vent 20, vent hole 17, movable valve mouth 18, valve chest 22, airport 23, passage 70, the chambers 63 and 64 of the main valve 46, and passage 71, because the air pressures in said two chambers are balanced or the pressure in the right hand chamber is slightly higher than the pressure in the other chamber. Therefore, the servo-motor diaphragm 11 is moved rightward by the recovering force of the clutch and the repulsive force of the spring 24, and the air inside the right servo-motor chamber 12 flows toward the left hand chamber 13 to begin connecting the clutch. At the same time, the movable valve mouth 18 is displaced until it contacts the movable valve seat 34, and the rightwardly moving valve seat 34 is followed without any time lag by the movable valve mouth 18 together with the diaphragm 11, in the direction where the clutch is completely connected. Of course, at this juncture, the accelerator switch 55 is still on as well as the change lever switch 54, and therefore the free path relay 53 is operating and the passages 80 and 79 are both closed.

As described above, the follow-up operation is performed in a very short period of time, so that the time lag in clutch control can be minimized.

Such a cooperative motion of the movable valve mouth 18 and movable valve seat 34 gradually increases the degree of clutch connection proportionally with the degree of the accelerator pedal working, that is, the increase in the number of revolutions of the engine, thereby performing stroke control with respect to the clutch. It is an outstanding feature of the present invention that, as compared with the automatic clutch control apparatus known so far which is intended merely for control in terms of time for clutch connection, the apparatus according to the invention accomplishes not only time control but stroke control of the clutch. With this advantage, the apparatus permits the vehicle to start in the most ideal manner and prevents abrasion of the clutch facings almost completely.

If the accelerator pedal is trodden further downward (while the vehicle is already running), the increased number of engine revolutions turns off the accelerator switch 55, and the free path relay 53 opens the contacts 57. Thereupon, the magnet 59 of the free path valve 58 loses its magnetic force, and the valve 77 is opened by the return spring 78. In this way the passages 79 and 80 are communicated with each other, and the air inside the right servo-motor chamber 12 is freely communicated with the left servo-motor chamber 13 without being restricted by the movable valve mouth 18 and the movable valve seat 34 as before. Then, by the recovering force of the clutch, the diaphragm 11 is moved quickly rightward, and the clutch is connected completely without encountering any resistance against the connecting operation, as the clutch release lever 10 is brought to the position P.

As will be understood from the foregoing description, the accelerator switch 55 helps the clutch accomplish perfect connection quickly at the time when the clutch becomes ready for connection.

When the change gear is to be changed after the vehicle has been started by the foregoing procedure and has reached a prescribed speed (in the low speed range), from said speed to a higher speed in the second or third gear range (or the third or fourth gear range, as the case may be), it is not necessary to maintain the clutch in a half-connected condition for a comparatively lengthy period of time as in the case of low speed running (that is, the duration in which the clutch release lever is shifted from the position H to the position P), for connecting the clutch following the gear change. In other words, complete connection of the clutch must be accomplished within a short period after the clutch release lever 10 has completely disconnected the clutch. This end can be adequately met by the present invention.

Now that the prescribed speed of the automobile in the low speed range has been attained by the foregoing procedure, the vehicle is running smoothly. The accelerator switch 55 is in the OFF position. At this juncture, if the driver grips the change lever 42 for the purpose of changing the speed, the switch 43 is closed, so that the main valve relay 41 operates to close the contacts 45, in the entirely same manner as in the case of starting at a low speed as described above, and the valves 72, 73, and 74 of the main valve 46 operate, that is, the air suction valve 72 and negative pressure valve 74 open while the equalizing valve 73 closes. Accordingly, the air inside the left servo-motor chamber 13 is sucked up into the negative pressure tank 67, and further flows into the right servo-motor chamber 12, through the air cleaner 61, chambers 62 and 63, passages 70 and 79, free path valve 58, passage 80, and the airport 14. As the result, the air pressure in said left hand chamber 13 drops, whereas the pressure in said right hand chamber 12 rises. The diaphragm 11 moves toward the left hand chamber 13, and the piston 4 is also moved leftward by means of the piston rod 16, whereby the hydraulic device 3 supplies oil pressure to the sleeve cylinder 7, and the clutch release lever 10 quickly moves to the position D to cut off the clutch. At this time, the diaphragm 27 of the control valve 2 stands still in the position indicated in FIG. 1, since the negative pressure chamber 28 is subjected to the negative pressure of the carburetor venturi C. If the driver then manipulates the change lever 42 to shift the gear to the second gear position (or the third gear position as the case may be) and then lets go his hold of said lever 42, then the switch 43 is turned off and the main valve 41 opens the contacts 45, so that the air suction valve 72 and negative pressure valve 74 are closed while the equalizing valve 73 is opened. The change lever switch 54 is in the OFF position because the change gear is shifted to the high speed range, and its circuit is kept open. Therefore, the free path relay 53 does not operate as when the vehicle is started, and the valve 77 of the free path valve 53 remains opened. The right servo-motor chamber 12 is communicated with the left servo-motor chamber 13 through the airports 14 and 15, passages 80, 79, 70, and 71, free path valve 58, and chambers 63 and 64 of the main valve 46, whereby the air pressure in the right hand chamber 12 and the left hand chamber 13 are quickly equalized. Consequently, the diaphragm 11 moves rightward without giving any resistance to the recovering force of the clutch (i.e. the force which urges the clutch to be connected). Also the diaphragm 27 of the control valve 2 is displaced toward the negative pressure chamber 28 under the negative pressure from the carburetor venturi C, and the movable valve seat 34 is displaced to the right side of the valve chest 22 in the similar fashion. Thus, the above operation is performed so quickly that the disconnection and connection of the clutch are accomplished in a very short period of time.

In brief, it is possible according to the invention that the connection and disconnection of the clutch are accomplished in conditions best adapted for starting the vehicle and for gear changing during high speed running, moreover in right proportion to the particular number of revolutions of the engine.

In case when an engine brake is found necessary and applied while the change gear is in the second gear position (or the third position) within the high speed range, there is no possibility of the clutch being disconnected. This is because the negative pressure of the carburetor venturi C works on the right hand chamber 28 of the control valve 2 due to the considerably high number of revolutions of the engine and, accordingly, the diaphragm 27 is displaced toward the right hand chamber 28, and because the relays 41, 49, and 53 remain inactive, and therefore the air suction valve 72 and negative pressure valve 74 are closed while the equalizing valve 73 is opened, and further because the valve 77 of the free path valve 58 is also open so that the diaphragm 11 is displaced toward the right hand chamber 12 under the full recovering force of the clutch.

If, in this case, the engine revolutions drop to a value less than the ordinary number of revolutions for idling, the idling relay 49 operates to disconect the clutch as described above. Hence, no possibility of unwanted engine stop. The engine brake can be applied as well in the low speed range of the change gear, that is, in the first gear (or the second gear) position, in a fool-proof manner, as the apparatus of the invention follows the procedure corresponding to that described above.

The position of the clutch immediately before connection can be adjusted proportionally with a given number of revolutions of the engine, in the following manner.

Inasmuch as the servo-motor 1 and the control valve 2 are connected together by means of the tapped barrel 25 and the lock nut 26 to provide an integral unit, it is possible to rotate either one of them relatively close to or apart from the other. In other words, the relative distance between the servo-motor 1 and the control valve 2 represents the relative distance between the piston rod 16 and the connecting rod 32 fixed to the diaphragms 11 and 27, respectively. Those distances are useful for adjusting the clearance between the movable valve mouth 18 and the movable valve seat 34 and their positions for contacting (contacting time). If the clearance is increased, the distance between the positions D and H for the clutch release lever 10 shown in FIG. 2 is increased correspondingly, and if the clearance is decreased, the distance between the positions D and H is narrowed. It means that the stroke which the movable valve mouth 18 requires to make contact with the movable valve seat 34 is varied by the above adjustment. This will be clearly understood from the behaviors of the servo-motor and control valve illustrated above.

When the clutch is in the half-connected condition, or when the clutch release lever 10 passes through the position H to the position P, the time control can be achieved as desired by adjusting the adjust screw 36 which receives the compression spring 37 of the control valve 2. If the screw 36 is further screwed in, the pressure of the compression spring 37 is raised and the resistance exerted by the negative pressure of the carburetor venturi is increased against the velocity at which the diaphragm 27 moves toward the negative pressure chamber 28. Conversely, if the screw 36 is screwed back, the pressure is lowered and hence the resistance is decreased. Thus, if the resistance is increased, the diaphragm 27 is not moved rightward until the number of revolutions of the engine reaches a considerably high level, and therefore the follow-up time of the diaphragm 11 of the servo-motor 1 is lengthened and the duration of the time in which the clutch remains half-connected is prolonged. If, on the contrary, the force of the compression spring 37 is lessened, the duration of the half-connected condition of the clutch is shortened.

Thus, according to the present invention, the stroke with the play of the clutch and the time for which the clutch is maintained in the half-connected condition can be controlled with ease.

Further, it becomes readily possible by modifying the embodiment of the invention shown and described herein to arrange the relative positions of the movable valve mouth 18 and the movable valve seat 34 so that the negative pressure of the carburetor venturi operates the servo-motor and the negative pressure of the intake manifold operates the control valve, and also to replace the movable valve seat 34 with a piston which moves back and forth within the valve chest 22.

The speed at which the control valve diaphragm 27 is moved rightward by the negative pressure in the carburetor venturi C corresponds accurately to the rate of increase of the negative pressure to be transmitted to the negative pressure chamber of the control valve. Therefore, as will be understood from the description made above with reference to FIG. 3, quick treading of the accelerator pedal may cause the clutch connection to lag behind the increase of the number of revolutions of the engine.

In the light of such possibility, the clutch connection is accomplished promptly according to the invention by utilizing the sharp decrease of the negative pressure (curve 203, FIG. 3) in the intake manifold upon sudden working of the accelerator pedal.

Bypasses 85 and 86 are provided, respectively, on the passage 79 communicating the free path valve 58 within the main valve 46 and on the passage 80 communicating the valve 58 with the servo-motor 1. The bypasses 85 and 86 have their openings in valve chests 87 and 88, respectively, of a rapid starting device 99, designed to be opened and closed by a valve 89. The valve 89 is connected through a valve rod 90 to a diaphragm 93 which defines a negative pressure chamber 91 and an atmospheric air chamber 92. In the latter chamber, an air vent 94 is formed so as not to obstruct the movement of the diaphragm 93. The diaphragm 93 is normally pressed toward the atmospheric air chamber 92 to open the valve 89, by a spring 96 whose compression force is regulated by an adjust screw 95. The negative pressure chamber 91 is communicated with the intake manifold M through a passage 97. The numeral 98 indicates a rubber seal which hermetically seals the valve chest 87.

The negative pressure in the intake manifold M at the moment the engine has been started is considerably high as charted in FIG. 3. Therefore, the negative pressure in the negative pressure chamber 91 is increased correspondingly, with the result that the diaphragm 93 is attracted toward the negative pressure chamber 91 against the force of the spring 96, thereby to close the valve 89 and shut off the bypasses 85 and 86, respectively, of the passages 79 and 80 communicating with the free path valve 58.

If the driver works the accelerator pedal vigorously to accelerate the engine speed for the purpose of quick starting, the negative pressure in the intake manifold M drops sharply as indicated by the curve 203 in FIG. 3, with a consequent drop of the negative pressure in the negative pressure chamber 91. In response to the sharp drop of the negative pressure in the negative pressure chamber 91, the diaphragm 93 is moved toward the atmospheric air chamber 92 under pressure by the spring 96. The timing of the movement of the diaphragm 93 toward the atmospheric air chamber 92 may be controlled by adjusting the repulsive force of the spring 96 to match adequately the negative pressure (line 200) of the control valve 2 at which said valve begins to connect the clutch, so that, when the accelerator pedal is worked quickly, the valve 89 opens the bypasses 85 and 86 as soon as the negative pressure in the intake manifold drops to a value indicated by the point 209, or when the pedal is worked normally, the valve 89 opens the bypasses at the point 208. It is further advisable that adjustment is made so that, when the accelerator pedal is trodden gradually, the bypasses 85 and 86 are normally not opened.

If, in order to start the vehicle, the driver turns on the ignition key switch 40 thereby starting the engine, shift the change lever 42, and then quits his hold of said lever 42, the valve 77 of the free path valve 58 is closed to shut off the passages 79 and 80, and only the equalizing valve 73 of the main valve 46 is opened, while the right hand chamber 12 and the left hand chamber 13 of the servo-motor 1 are communicated with each other through merely the valve chest 22. Hence, the clutch is in a position immediately before connection by means of the diaphragm 27 of the control valve 2.

At this time, sudden working of the accelerator pedal with a consequent increase in the number of revolutions of the engine is not necessarily accompanied with a correspondingly sharp increase of the negative pressure in the negative pressure chamber 28 of the control valve 2 to a level sufficient for effecting the clutch connection. (See the curve 205, FIG. 3.) To preclude such a possibility, the quick starting device 99 is provided, whereby, if the negative pressure in the intake manifold M drops sharply, the diaphragm 93 is displaced toward the atmospheric air chamber 92 to open the valve 89 and the bypasses 85 and 86 of the passages 79 and 80, respectively, with the result that the right hand chamber 12 and the left hand chamber 13 of the servo-motor 1 are released from the control by the movable valve seat 34 and the movable valve mouth 18 in the valve chest 22 in defiance of the function of the free path valve 58, and are communicated with each other through the passages 71 and 79, bypasses 85 and 86, and passage 80. Accordingly, the air pressures in the right hand chamber 12 and the left hand chamber 13 are promptly equalized, and the valve rod 16 of the servo-motor diaphragm 11 and the connecting rod 32 of the control valve diaphragm 27 are subjected to the recovering force of the clutch, so that the diaphragms 11 and 27 move rightward regardless of the negative pressure in the control valve negative pressure chamber 28, thereby to connect the clutch.

When the vehicle is started in the normal or gradual fashion, the diaphragm 93 of the quick starting device 99 does not move toward the atmospheric air chamber 92 to open the valve 89, as will be apparent from FIG. 3, before the negative pressure in the negative pressure chamber 28 of the control valve 2 has risen to connect the clutch, and the operation of the free path valve 58 is so timed that it is only after the valve 58 has fulfilled the purpose originally intended that it serves as the bypass. Hence, the free path valve 58 is not obstructed in functioning as such.

It will be seen from FIG. 3 that, when the accelerator pedal is trodden gradually, the clutch is connected at the point 206 for starting the vehicle, whereas, when the pedal is worked quickly, the clutch is connected at the point 207, indicating a considerable time lag behind the former case.

The above difficulty is circumvented by providing a compensating device as illustrated in FIG. 5. The device comprises an airtight chamber 103 whose capacity is increased proportionally with the degree of treading pressure applied to the accelerator pedal 109 and which is communicated with the negative pressure chamber 28 of the control valve through a passage 100.

The airtight chamber 103 is defined by a diaphragm 104 placed in a housing 101, said diaphragm 104 being coupled to the accelerator pedal 109, through connecting rods 106 and 108. The housing 101 also defines an atmospheric air chamber 102, which is communicated to atmosphere through an air vent 105. The diaphragm 104 is pressed toward the airtight chamber 103 by a return spring 107.

Quick treading of the accelerator pedal 109 causes the diaphragm 104 to move rightward to the position indicated by imaginary lines in FIG. 5, with the result that the capacity of the airtight chamber 103 is increased and the air pressure therein drops sharply. For this reason, the air pressure inside the negative pressure chamber 28 of the control valve decreases rapidly, even though the negative pressure from the carburetor venturi C is not transmitted sufficiently, and the control valve diaphragm 27 moves quickly rightward as shown, so that the clutch is accordingly connected quickly as described before.

In this case, the sharp drop of pressure in the negative pressure chamber 28 of the control valve is liable to be equalized with the comparatively low negative pressure in the carburetor venturi C through the passage 83, the tendency can give no adverse effect upon the advance of the vehicle because the clutch has already been connected and the vehicle has started running. When the accelerator pedal is trodden by degrees, the capacity of the airtight chamber 103 is also increased gradually, and hence there is no danger that the increase in the capacity of said chamber 103 should give any undesirable effect upon the rightward movement of the control valve diaphragm 27.

When the accelerator pedal has been worked quickly, the clutch is connected and the vehicle starts, owing to the functions described above, and subsequently the negative pressure in the negative pressure chamber of the control valve is increased to carry on control of the control valve diaphragm 27.

For the negative pressure to be transmitted from the carburetor venturi C to the negative pressure chamber of the control valve, the operation of the control valve can be corrected to some extent by improving the shape or length, inside diameter, and the like of the passage 83. However, it is impracticable to alter the shape or length, inside diameter, and the like of the passage 83 so that they best meet different starting conditions, for example both quick and slow starting conditions.

A variable throttle valve 110 is divided by a valve seat 111 into chambers 113 and 114, in which a passage 83a from the carburetor venturi C and a passage 83b extending to the control valve negative pressure chamber 28 have their openings, respectively. The valve seat 111 is disposed opposite to a throttle valve 112, which is manipulated at will by an automatic or manual operating means which is to be described later, through a connecting rod 116, in order to control the size of the clearance formed between the valve seat 111 and the valve 112. The numeral 115 represents a rubber seal.

A narrow clearance between the valve 112 and the valve seat 111 means a correspondingly reduced cross sectional area of the passage 83. Therefore, the rate of increase of the negative pressure in the control valve negative pressure chamber 28 can be slowed down as compared with that of the negative pressure in the carburetor venturi C, thereby to time the clutch connection with the increase of the engine revolutions to a degree suitable for starting of the vehicle. Conversely, the throttle valve, when opened wide, can attain the same effect as the passage 83 with an expanded cross sectional area, and the negative pressure in the carburetor venturi C can be transmitted quickly to the control valve negative pressure chamber 28, thereby to compensate for any delay in clutch connection for quick starting of the vehicle.

Such a variable throttle valve can be operated either automatically or by hand.

FIG. 6 shows the controlling device of the automatic type. The negative pressure in the intake manifold M has tendencies to draw curves 201, 202, and 203, as described above, with respect to the engine speed. If the accelerator pedal is worked gradually, the negative pressure decreases gradually, whereas if the pedal is worked quickly, the value drops quickly.

The negative pressure in the intake manifold is utilized in the automatic controlling device for the variable throttle valve.

The controlling device for the variable throttle valve consists of a diaphragm 120 provided in a housing 119, thereby defining an airtight chamber 121 and an atmospheric air chamber 122 which is communicated to atmosphere through a vent hole 125. The diaphragm 120 is operated by a compression spring 123 whose repulsive force is adjusted by an adjust screw 124, and is so constructed as to be usually deflected toward the atmospheric air chamber 122. A connecting rod fixed to the diaphragm 120 is coupled to the connecting rod 116 of the variable throttle valve by means of a connecting rod 117 which is adjustable 118 lengthwise. The airtight chamber 121 is so constructed as to be subjected to the negative pressure from the intake manifold M through a passage 127.

If, then, the accelerator pedal is worked gradually, the negative pressure of the intake manifold is maintained at high values for a considerably long period as represented by the curves 201 and 202. Therefore, the diaphragm 120 in the above structure is deflected toward the airtight chamber 121 while the negative pressure valve in the intake manifold M is high, because the negative pressure in the airtight chamber 121 is also high, and keeps the throttle valve 110 narrowly open, through the connecting rods 126, 117 and 116. When the negative pressure value has been decreased to the point 208, the diaphragm is moved toward the atmospheric air chamber by means of the compression spring 123, thereby to open the valve widely. In other words, the diaphragm controls the velocity with which the negative pressure in the carburetor venturi C is transmitted to the control valve negative pressure chamber 28, and retards the operation of the control valve diaphragm, so as to prevent premature connection of the clutch.

Quick working of the accelerator pedal causes a correspondingly sharp drop of the negative pressure in the intake manifold as indicated by the curve 203. As the result, the negative pressure in the airtight chamber 121 also drops rapidly until the diaphragm 120 is displaced at the point 209 toward the atmospheric air chamber 122 by the compression spring 123, thereby increasing the opening of the variable throttle valve 110, transmitting the negative pressure of the carburetor venturi C quickly to the negative pressure chamber 28 of the control valve 2. Thus, the operation of the diaphragm 27 of said valve 2 is quickened, and the clutch connection is hastened, whereby racing of the engine or slippage of the clutch is prevented.

Similar effect can be expected of the device illustrated above, by replacing the housing 119 with a cylinder and the diaphragm 120 with a piston.

The manual manipulating means for the variable throttle valve according to the invention is shown in FIGS. 7 and 8.

Referring to FIG. 7, the valve 112 is connected to a lever 128 through the connecting rods 116 and 117, and the lever 128 is swingable supported by a pin 129.

When the lever 128 is in the position indicated by the full lines, the opening of the variable throttle valve is small, whereas, when the lever is in the position indicated by the imaginary lines, the opening is increased. Therefore, it is possible by manipulating the lever 128 to attain the same effect as by said automatic throttle valve means.

FIG. 8 illustrates a variable throttle valve coupled to an accelerator pedal 130, which is swingably supported by a pin 131. The valve 112 is connected to the accelerator pedal 130 through the connecting rods 116 and 117.

As the accelerator pedal is trodden with a gradually increasing pressure, the valve 112 opens gradually, too.

If the pedal is worked quickly, the opening of the valve 112 is increased correspondingly. Thus, the same effect as by the automatic variable throttle valve means can be achieved.

Inasmuch as the control valve diaphragm 27 operates in response to the negative pressure from the carburetor venturi C, the negative pressure in the carburetor venturi C may become greater when the choke lever has been manipulated for starting the engine in a cold season, than the pressure obtained at the time of normal engine starting, and hence the control valve diaphragm 27 may move toward the direction for clutch connection (the rightward direction as seen in the figure), thereby causing erroneous starting of the vehicle.

According to the present invention, the above device is provided with a passage 133 communicating the atmospheric air chamber 29 of the control valve with the carburetor venturi C through a valve 132, which, in turn, is connected to the manipulating lever 137 of the carburetor air valve 136 through the valve stem 134 and the connecting rod 135. The manipulating lever 137 is connected to the choke button (not shown) through cable wire 138 or the like. When the button is pulled, the opening of the air valve 136 is adjusted so as to change the fuel concentration in the combustible mixture. At this time, the valve mounted on the passage 133 is closed by the connecting rod 135 when the opening of said air valve 136 is at a maximum, whereas it opens the passage 133 when said air valve 136 is closed.

Thus, as described hereinbefore, the valve 132 is opened when the choke button is pulled to feed highly concentrated combustible mixture to the engine, and therefore the negative pressure in the carburetor venturi C which acts upon the negative pressure chamber 28 of the control valve 2 works, at the same time, upon the atmospheric air chamber 29 of the control valve 2 through the passage 133. Then, the air pressure in the atmospheric air chamber 29 drops somewhat below the atmospheric pressure because the vent hole (small hole) 31 of the atmospheric air chamber 29 is small in diameter, so as to retard the operation of the diaphragm 27 tending to move toward the negative pressure chamber 28, and to maintain said diaphragm 27 in contact with the inner wall of the control valve on the side of the atmospheric air chamber 29. That is to say, the control valve diaphragm 27 is kept in a state displaced toward the atmospheric air chamber 29 of the control valve, and hence the rightward movement of the servo-motor diaphragm 11 is also restricted, and the clutch is kept in the position immediately before connection, as described above.

In the event of breaking of the belt driving the cooling fan and dynamo (such an incident occurs particularly when the vehicle is running at a high speed) the dynamo 50 stops its function, so that the voltage of the storage battery 39 is applied to the idling relay 49 to close the contacts 52, with the result that the negative pressure valve 74 and the atmospheric air valve 72 of the main valve 46 are opened and the equalizing valve 73 of said main valve is closed, and that, consequently, the clutch is disconnected to make powered running of the vehicle no longer possible.

With a view to improving the safety in such a case, a special device is provided under the invention to permit the driver to run the vehicle without any help up to a turnout or repairshop.

In FIG. 10 there is shown such a device, which consists of an emergency switch 139 provided in a circuit connecting the main valve relay contacts 45 and the idling relay contacts 52 with the main valve magnet 47, said switch 139 being equipped with contacts N which open or close said electric circuit, and contacts p and d which, respectively connect and disconnect the clutch irrespective of said circuit.

Usually, when the dynamo 50 is working normally with the speed of the engine, the emergency switch 139 makes up the electric circuit with its contacts in the position N, thereby controlling the clutch in the ordinary fashion.

If the normal control of the clutch becomes impossible due to snapping of the fan belt for some reason or owing to an internal trouble of the dynamo 50, the emergency switch 139 is turned to the position p, where it opens said circuit in order to set the clutch free from the controlling action of the main valve magnet 47 exerted by dint of said circuit, so that the clutch is completely connected.

On the contrary, the position d is intended to make up a circuit which shorts the storage battery 39 and the main valve magnet 47. When the emergency switch 139 is turned to the position d, the main valve 46 opens the atmospheric air valve 72 and the negative pressure valve 74 and closes the equalizing valve 73, whereby the clutch is completely disconnected.

Thus, in case when the dynamo 50 has ceased generating due to breaking of the fan belt or by some other trouble, it is possible to drive the automobile, by manipulating the emergency switch 139, as far as a turnout or repairshop, though care must be taken not to cause overheating of the engine.

In the electric circuit illustrated above, the idling relay 49 is provided in order to prevent unintended engine stop. But the type of the relay 49 varies with the system of the charging dynamo employed, depending on the type of the automobile. The contacts 52 of the relay 49 may vibrate if the number of idling revolutions fluctuates widely. If a trouble occurs in the dynamo 50 or in the driving system, the idling relay 49 may lose its functions, as described above with references to the emergency switch. Further, the engine brake may be applied effectively by dint of the present mechanism. For these reasons, it is useful for improving and stabilizing the performance of the automatic clutch controlling apparatus of the invention that the above device directly detects the number of revolutions of the engine or the running speed of the vehicle, judges if there is any possibility of unwanted engine stop, and, if so, disconnects the clutch automatically.

Thus, a speed detecting relay 140 is inserted serially in a circuit which short-circuits the storage battery 39 and the main valve magnet 47. It comprises a centrifugal switch which is subjected to centrifugal force corresponding to the engine speed or the running speed of the vehicle, or some other suitable switch.

A centrifugal switch is used conveniently as it has a relatively simple structure and dispenses any complicated electric circuit. As shown in FIG. 10, a typical switch of this type consists of a lever having a suitable weight and contacts formed opposite to said lever, so constructed, for example, as to open the contacts at an engine speed of about 800 r.p.m. and close at about 400 r.p.m., or open the contacts at a drive shaft revolution of about 60 r.p.m. and close at about 45 r.p.m.

If the contacts of the detecting relay 140 are closed, the storage battery 39 and the main valve magnet 47 are shorted, and, by excitation of said magnet 47, the clutch is completely disconnected, and the contacts of the relay 140 are opened, whereby the electric circuit effects the control as described above, in accordance with the invention of the driver.

Just as important, it is automatically decided by a device whether the clutch should be disconnected or the engine brake be applied while the clutch is in connection, depending upon the brake manipulation for stopping or speed reduction of the vehicle. Thus, a quick-brake detecting relay is provided for preventing occurrence of an unwanted engine stop due to quick stopping of the vehicle.

In FIG. 10, a brake relay 142 is provided in parallel with stop lights 141. The relay is connected serially with the storage battery 39, quick-brake detecting switch 143, change gear switch 54, and accelerator switch, and is so constructed as to control the brake relay contacts 144, thereby to short-circuit said contacts 144 with the main valve magnet 47. The numeral 145 indicates a stop light switch.

The quick-brake detecting switch is designed to close the circuit only when the brake pedal is worked quickly, for example when the oil pressure increases sharply in case of a hydraulic brake. Otherwise, its contacts are kept open.

When the accelerator pedal is in the low speed range, and the change lever is shifted in the first speed gear (or the second gear) position or the reverse position, the inertia force of the engine and flywheel is great in comparison with the running speed of the vehicle, and it acts on the drive wheels, tending to delay the speed reduction of the vehicle, and it is liable to cause engine stop because the braking effect is increased with the reduction of the speed. According to the invention, however, the quick-brake detecting switch 143 closes the circuit in such a case and the quick-brake relay 142 is actuated to close its contacts 144, so that the voltage of the storage battery 39 excites the main valve magnet 47 to open the atmospheric air valve 72 and the negative pressure valve 74 of the main valve 46 and close the equalizing valve 73. Therefore, the clutch is disconnected as soon as a quick brake is applied while the vehicle is running at a low speed, but, if the brake is applied while the vehicle speed is high, the quick-brake relay 142 is not actuated because the change gear switch 54 opens the circuit, and the engine brake is applied instead.

Similarly, an exhaust pipe pressure switch 146 is provided in the short circuit for the storage battery 39 and main valve magnet 47.

As diagrammatically shown in FIG. 11, the exhaust pipe pressure switch 146 is disposed between the engine exhaust manifold X and the muffler 147, through an exhaust pipe 148 communicating with the latter two and having a branch pipe 149 communicated with a chamber 151 having a metallic diaphragm 150, which, when the exhaust pressure is low, is pressed by a spring 152 disposed on the other side of said chamber, toward the direction reducing the capacity of the chamber 151, but, if the exhaust pressure is increased, the diaphragm 150 jumps toward the opposite direction against the force of the spring 152. The diaphragm 150 is equipped with a connecting rod 153, and is so designed that it operates a contactor 154 correspondingly with the diaphragm 150, through said connecting rod 153. In the same figure, the numeral 155 indicates a pressure equalizing tank provided on the branch 149; the numeral 156 indicates a spring for maintaining the operating positions of said contactor 154; 157 an adjust screw of said spring 156; and 158 a contact on the input side.

While the engine is running at a low speed, the pressure inside the exhaust pipe is accordingly low, and the diaphragm 150 is pushed toward the chamber 151 by means of the spring 152. Hence, the contactor 154 closes the contact 158, and the main valve magnet 47 is excited by the storage battery 39, thereby disconnecting the clutch completely.

If the number of revolutions of the engine is increased and the pressure inside the exhaust pipe is raised to a predetermined value, the diaphragm 150, being made of metal, quickly jumps from the chamber 151 against the combined force of the springs 152 and 156, toward the other side, whereby the short circuit connecting the storage battery 39 and the main valve magnet 47 is opened by means of the contactor 154, and the clutch is subjected to control responsive to the intention of the driver. That is, the same effect is attained as by the idling relay 49 but without any play for contact making.

In order to ensure adequate timing for the jumping motion of the diaphragm 150, it is only necessary to adjust either the pressure of the spring 152 or that of the spring which works on the contactor 154.

We claim:

1. An automatic clutch controlling apparatus principally for automobiles having an engine which produces negative pressure at predetermined locations when operating, the combination including an air controlled device which comprises a main valve body, the main valve body being compartmentized into a plurality of compartments, a first compartment being open to the atmosphere, an atmospheric air suction valve and a pressure equalizing valve being disposed in a second compartment which is in communication with the first compartment, a negative pressure valve disposed in a third compartment, means interconnecting said valves for concurrent movement upon negative pressure caused by running of the engine and by atmospheric pressure induced through the first compartment, said latter valve being coupled to a speed adjustment control, a free pass valve body having a valve operative in response to the speed adjustment control, a servo motor for controlling the clutch, the servo motor having a diaphragm dividing the servo motor into first and second chambers, said valves being in communication with selected chambers of the servo motor through fluid passages so that the main valve body and free pass valve body are adapted to actuate the servo motor, hydraulic means in communication with the clutch and being responsive to action of the servo motor to effect connection and disconnection of the clutch, the hydraulic means interconnecting with a control valve having a diaphragm, the control device dividing the control valve into a plurality of chambers, one of said last named chambers being open to the atmosphere and a second chamber being open to negative pressure from the engine, the diaphragm being adapted to be actuated by negative pressure produced by running of the engine, a valve chest interconnecting the servo motor and the control valve, the control valve diaphragm dividing the control valve into first and second chambers, an elongated rod means interconnecting the hydraulic means with the control valve diaphragm through the servo motor and the valve chest, air equalization passages so formed as to communicate the valve chest and the first chamber defined by the control valve diaphragm with said main valve body, said rod means being so constructed as to be more responsive to negative pressure proportional to the number of revolutions of the engine in the range from the position immediately before clutch connection to the position for complete connection of the clutch.

2. An apparatus according to claim 1, wherein said rod means terminate with the control valve, means integral with the control valve to adjustably position the rod means along the longitudinal length thereof.

3. An apparatus according to claim 1 including a compression spring mounted in the negative pressure chamber of said control valve in such a manner that it gives resistance to the displacement of the control valve diaphragm due to said negative pressure, and means integral to vary the compression spring force.

4. An apparatus according to claim 1 which further includes a pressure operated throttle means, and means for compensating the operation of the control valve comprising an airtight chamber whose capacity is increased proportionally with the degree of pressure applied to the throttle means, said compensating means communicating with the negative pressure chamber of the control valve.

5. An apparatus according to claim 4, wherein the throttle means included a variable throttle valve means comprising a variable throttle valve having an adjustable opening, the variable throttle valve being interposed between the negative pressure of the engine and the negative pressure chamber of the control valve.

6. An apparatus according to claim 1 wherein the engine includes an intake manifold and a carburetor venturi to produce negative pressures and a choke control means, an interlocking device for control of the choke means comprising a passage equipped with a valve and communicating the negative pressure outlet of the carburetor venturi with the atmospheric air chamber of the control valve, said valve being designed to open or close said passage in response to manipulation of the choke means so that the increase of the fuel concentration in the engine combustible mixture the negative pressure of the carburetor venturi changes the configuration of the atmospheric air chamber as well as the negative pressure chamber of the control valve.

7. In an automatic clutch controlling apparatus principally for automobiles having an engine producing negative pressures at predetermined locations, the combination of valve means operated in part by negative pressure produced by running of the engine and also to atmospheric pressure, electrical controlling circuit means adapted to actuate the said valve means by starting of the engine, a servo motor being actuated under control by a second valve means, said servo motor being adapted for effecting connection and disconnection of the clutch through a hydraulic means, and a control valve for controlling the operation of the servo motor in response to the negative pressure produced by the revolution of the engine, said controlling circuit comprising a storage battery and an electromagnetic means for selectively actuating the main valve, and switch means for controlling said circuit.

8. In an automatic clutch controlling apparatus principally for automobiles having an engine producing negative pressures at predetermined locations, the combination of valve means operated in part by negative pressures produced by running of the engine and also to atmospheric pressure, electrical controlling circuit means adapted to actuate said valve means by starting of the engine, a servo motor being actuated under control by a second valve means, said servo motor being adapted for effecting connection and disconnection of the clutch through a hydraulic means, and a control valve for controlling the operation of the servo motor in response to the negative pressure produced by the revolutions of the engine, said controlling circuit comprising a storage battery and an electromagnetic means for selectively actuating the main valve, and a switch means for controlling said circuit so as to selectively open and close said electric circuit correspondingly to the speed of the engine.

9. An electric circuit according to claim 8, the automobile having braking means, the switch means adapted to be actuated by a quick braking switch in response to rapid application of the braking means applied in low speed range of the automobile, the electric circuit being thereby opened and closed by a quick brake detecting relay.

10. An electric circuit according to claim 8, wherein the switch means is adapted to open and close the electric circuit in response to internal pressure in the engine exhaust manifold.

References Cited by the Examiner
UNITED STATES PATENTS

| | | | |
|---|---|---|---|
| 2,065,980 | 12/1936 | Maybach | 192—.055 |
| 2,163,903 | 6/1939 | Whittington | 192—.07 |
| 2,763,347 | 9/1956 | Haubourdin et al. | 192—.052 |
| 2,765,889 | 10/1956 | Court | 192—.09 |
| 3,165,008 | 1/1965 | Forster | 74—472.4 |

MARK NEWMAN, *Primary Examiner.*

DAVID J. WILLIAMOWSKY, *Examiner.*

A. T. McKEON, *Assistant Examiner.*